(12) United States Patent
Zhang et al.

(10) Patent No.: US 11,201,956 B2
(45) Date of Patent: Dec. 14, 2021

(54) INACTIVE STATE SECURITY SUPPORT IN WIRELESS COMMUNICATIONS SYSTEM

(71) Applicant: Nokia Technologies Oy, Espoo (FI)

(72) Inventors: Yanji Zhang, Beijing (CN); Mikko Saily, Laukkoski (FI); Sofonias Hailu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 124 days.

(21) Appl. No.: 16/476,196

(22) PCT Filed: Jan. 5, 2017

(86) PCT No.: PCT/CN2017/070305
§ 371 (c)(1),
(2) Date: Jul. 5, 2019

(87) PCT Pub. No.: WO2018/126400
PCT Pub. Date: Jul. 12, 2018

(65) Prior Publication Data
US 2020/0029206 A1   Jan. 23, 2020

(51) Int. Cl.
*H04W 12/00* (2021.01)
*H04W 12/04* (2021.01)
(Continued)

(52) U.S. Cl.
CPC ............ *H04L 69/28* (2013.01); *H04L 9/0891* (2013.01); *H04L 9/0894* (2013.01); *H04W 12/033* (2021.01); *H04W 12/037* (2021.01); *H04W 12/041* (2021.01); *H04W 12/06* (2013.01); *H04W 28/04* (2013.01);
(Continued)

(58) Field of Classification Search
CPC ..... H04L 69/28; H04L 9/0891; H04L 9/0894; H04W 12/0401; H04W 12/0013; H04W 12/0017; H04W 12/06; H04W 28/04; H04W 52/0203; H04W 52/0235
See application file for complete search history.

(56) References Cited

U.S. PATENT DOCUMENTS 9,271,183 B1 * 2/2016 Oroskar ............ H04W 72/1252
2008/0002692 A1   1/2008 Meylan et al.
(Continued)

FOREIGN PATENT DOCUMENTS

CN   101035357 A   9/2007
CN   102638793 A   8/2012
(Continued)

OTHER PUBLICATIONS

"3rd Generation Partnership Project; Technical Specification Group Radio Access Network; Study on Scenarios and Requirements for Next Generation Access Technologies; (Release 14)", 3GPP TR 38.913, V14.0.0, Oct. 2016, pp. 1-39.
(Continued)

*Primary Examiner* — Kambiz Zand
*Assistant Examiner* — Phuc Pham
(74) *Attorney, Agent, or Firm* — Harrington & Smith (57) ABSTRACT

According to an example aspect of the present invention, there is provided a method, comprising: storing a security context comprising a first key for wireless data transmission, and applying a timer for defining validity of the security context for the data transmission during an inactive state.

20 Claims, 6 Drawing Sheets

(51) Int. Cl.

| | |
|---|---|
| *H04W 12/06* | (2021.01) |
| *H04W 12/10* | (2021.01) |
| *H04W 28/02* | (2009.01) |
| *H04W 28/04* | (2009.01) |
| *H04L 9/08* | (2006.01) |
| *H04L 29/06* | (2006.01) |
| *H04W 52/02* | (2009.01) |
| *H04W 12/033* | (2021.01) |
| *H04W 12/037* | (2021.01) |
| *H04W 12/041* | (2021.01) |
| *H04L 29/08* | (2006.01) |

(52) U.S. Cl.
CPC ... *H04W 52/0203* (2013.01); *H04W 52/0235* (2013.01); *H04L 67/12* (2013.01)

(56) References Cited

U.S. PATENT DOCUMENTS

| | | | | |
|---|---|---|---|---|
| 2009/0103728 | A1* | 4/2009 | Patel | H04W 12/0431 380/247 |
| 2010/0054472 | A1* | 3/2010 | Barany | H04W 12/108 380/270 |
| 2012/0281566 | A1 | 11/2012 | Pelletier et al. | |
| 2013/0294314 | A1 | 11/2013 | Lee et al. | |
| 2013/0301611 | A1* | 11/2013 | Baghel | H04W 72/04 370/331 |
| 2018/0376452 | A1* | 12/2018 | Wei | H04W 76/27 |

FOREIGN PATENT DOCUMENTS

| | | |
|---|---|---|
| EP | 2640110 A1 | 9/2013 |
| WO | 2016/150479 A1 | 9/2016 |
| WO | 2016/196943 A1 | 12/2016 |

OTHER PUBLICATIONS

"Security in NR", 3GPP TSG-RAN WG2 meeting #96, R2-167799, Agenda: 9.2.2 4, Ericsson, Nov. 14-18, 2016, pp. 1-6.

"3rd Generation Partnership Project; Technical Specification Group Services and System Aspects; 3GPP System Architecture Evolution (SAE); Security architecture (Release 14)", 3GPP TS 33.401, V14.0.0, Sep. 2016, pp. 1-152.

"3rd Generation Partnership Project; Technical Specification Group Radio Access Network; Study on New Radio Access Technology; Radio Interface Protocol Aspects (Release 14)", 3GPP TR 38.804, V0.4.0, Nov. 2016, 31 pages.

"3rd Generation Partnership Project; Technical Specification Group Radio Access Network; Evolved Universal Terrestrial Radio Access (E-UTRA); Radio Resource Control (RRC); Protocol specification (Release 13)", 3GPP TS 36.331, V13.3.0, Sep. 2016, pp. 1-627.

International Search Report and Written Opinion received for corresponding Patent Cooperation Treaty Application No. PCT/CN2017/070305, dated Oct. 11, 2017, 11 pages.

"Issue on Resume Procedure", 3GPP TSG-RAN WG2 meeting #95, R2-164862, Agenda: 7.14.1, ZTE, Aug. 22-26, 2016, 7 pages.

"The Functions of Light Connection", 3GPP TSG-RAN WG2 meeting #95, R2-165246, Agenda: 8.9.1, Huawei, Aug. 22-26, 2016, 4 pages.

Extended European Search Report received for corresponding European Patent Application No. 17890700.2, dated Sep. 16, 2020, 8 pages.

* cited by examiner

INACTIVE STATE SECURITY SUPPORT IN WIRELESS COMMUNICATIONS SYSTEM

RELATED APPLICATION

This application was originally filed as Patent Cooperation Treaty Application No. PCT/CN2017/070305 filed Jan. 5, 2017.

FIELD

The present invention relates to security support in wireless communications systems, and in particular to security support during inactive state.

BACKGROUND

With the fast increase of new devices being wirelessly connected and substantial traffic growth, requirements for wireless networks and connections are also changing. For example, various Internet of Things (IoT) devices may send occasionally or periodically send uplink data while having high requirements on power-saving. Various power-saving mechanisms have been developed for wireless networks. Wireless terminals may be set to a power-saving, sleep, idle, low activity or inactive state or mode to save power. For example, a radio resource connection may be suspended, and again resumed upon need to transmit or receive data.

Appropriate security support is needed for power-saving mechanisms. For example, the radio access network node and the terminal need to operate in uniform fashion regarding ciphering when the power-saving mechanism is activated or deactivated.

SUMMARY

The invention is defined by the features of the independent claims. Some specific embodiments are defined in the dependent claims.

According to an aspect of the present invention, there is provided a method, comprising: storing a security context comprising a first key for wireless data transmission, and applying a timer for defining validity of the security context for the data transmission during an inactive state.

According to another aspect of the present invention, there is provided an apparatus, comprising at least one processing core, at least one memory including computer program code, the at least one memory and the computer program code being configured to, with the at least one processing core, cause the apparatus at least to:
store a security context comprising a first key for wireless data transmission, and
apply a timer for defining validity of the security context for the data transmission during an inactive state.

According to a still further aspect, there is provided a method and apparatus, configured to send or receive a message comprising an element for an authentication token for verifying the message for wireless data transmission during an inactive state, wherein the message is a request for transmission of unscheduled uplink data during the inactive state or a response to such request. The authentication token may be a message authentication code for integrity (MAC-I) calculated by using an integrity key used for integrity protection of the data over wireless interface during inactive state.

According to a yet another aspect, there is provided a method and apparatus, configured to detect an error in wireless transmission of uplink data during an inactive state, and sending a message comprising a cause value indicating the error. The message may be a response to a request for unscheduled transmission of data in inactive state. The cause value may indicate a failure in checking an authentication token from the user equipment, lack of valid user equipment context, or an overload of non-scheduled transmission resource, for example. A method and apparatus may be provided, configured to receive such message and cause change from inactive state to another state or mode of the inactive mode, such as radio resource control active state or radio resource control idle state in response to such message.

EMBODIMENTS

Figure 1:
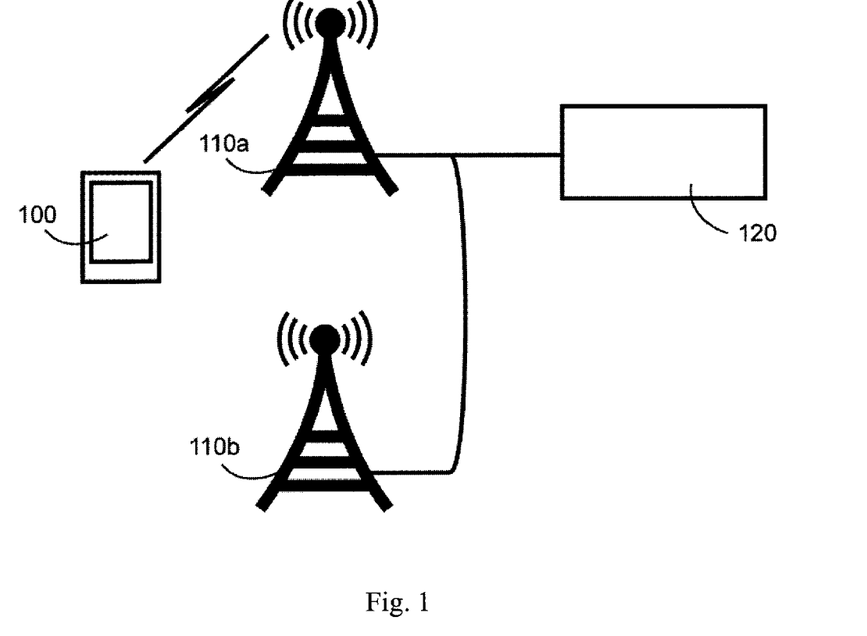
FIG. 1 illustrates an example of a wireless communication scenario to which embodiments of the invention may be applied.

FIG. 1 illustrates a simplified example of a wireless system. User equipment (UE) 100 communicates wirelessly with a wireless access network node 110, such as a NodeB, evolved NodeB (eNB), Next Generation (NG) NodeB (gNB), a base station, an access point, or other suitable wireless/radio access network device or system. Without limiting to Third Generation Partnership Project (3GPP) User Equipment, the term user equipment is to be understood broadly to cover various mobile/wireless terminal devices, mobile stations and user devices for user communication and/or machine to machine type communication. The access network node 110a, 110b is connected to further network node(s), such as a Next Generation core network, Evolved Packet Core (EPC), or other network management element. The access network nodes 110a, 110b may be interfaced for supporting mobility of the UE 100, e.g. by 3GPP X2 or similar NG interface.

Figure 2:
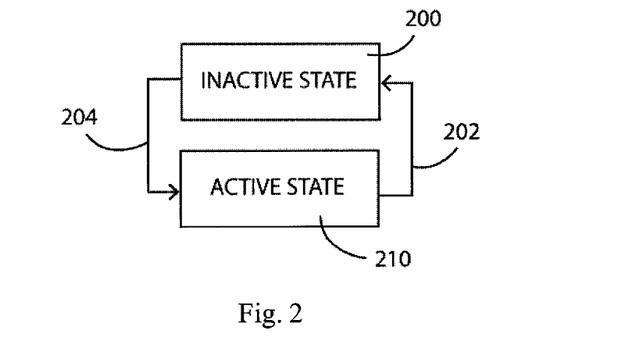
FIG. 2 illustrates operational states or modes in accordance with at least some embodiments of the present invention.

FIG. 2 illustrates operational states or modes for wireless communications according to some embodiments. In an active state 210 the UE 100 may maintain its radio interface powered constantly. The UE may be switched 202 to an inactive state 200. The term inactive state refers generally to a state or mode enabling power-saving, during which the wireless device may however send and/or receive some data according to some embodiments.

Within the inactive state 200, radio access and/or core network connection information established during the active state 210 may be maintained. The UE 100 and at least one network element, such as the network node 110a last serving the UE 100, maintain selected UE context information during the inactive state, such as security context information established and stored during the active state. Using the stored information, the UE may transmit data in an autonomous, grant-free or contention based manner without transition 204 to the active state 210. Thus, data may be transmitted without or with minimal preceding signalling over the wireless interface and related processing, facilitating reduced signalling overhead and power consumption. UE location information may be maintained in the network, for example at radio access network based area level, such as a single cell or a group of cells.

FIG. 2 illustrates only two states, but it is to be appreciated that there may be one or more further states, or sub-states. For example, there may be an idle state, which may be entered from the inactive state 200 and the active state 210. The idle state may be such that no UE context is stored and defined as a default state during switching power on and fault. The idle state may be similar to the 3GPP radio resource control (RRC) RRC Idle state. The inactive state 200 may be the main inactivity state, during which the UE context may be stored in the UE 100 and network 110a and also the radio access network-core network connection may be maintained. In an embodiment, the active state 210 may be similar to the 3GPP RRC Connected state.

According to an embodiment, the active state 210 and the inactive state 200 comply with the active state and the inactive state specified in 3GPP N-RAT specifications. The UE and the network may store a part of the Access Stratum (AS) UE context during the inactive state. It should be noted, however, during initial power on or fault, the UE may enter an N-RAT idle state where there is no UE AS context stored in the UE or the network. In the inactive state 200, the UE may monitor a physical downlink control channel (PDCCH) continuously and/or discontinuously, for instance a network configures the UE with one or more time-offsets: one for defining the duration of the continuous monitoring and another for defining the discontinuous monitoring. The UE may also monitor a paging or a notification channel, typically from a specific occasion determined by a notification cycle. In other words, the inactive state may be configurable. The inactive state may be controlled by the radio access network, such as the access network node 110a, 110b.

The change 202, 204 between the states may comprise change of RRC connection state, by an RRC connection suspend and resume procedures, respectively. In 3GPP Long Term Evolution (LTE), when the UE wakes up to transmit uplink (UL) data, it needs to perform the RRC connection resume procedure and derive a new encryption key before it can transmit the data. The amount of data to be transmitted during the inactive state 200 may be small. For example, it may be desirable to maintain a sensor device in low power consumption mode and send only periodically small amount of measurement data. There are now provided security support functions for inactive state enabling further reduced wireless interface signalling and hence related processing at wireless devices.

Figure 3:
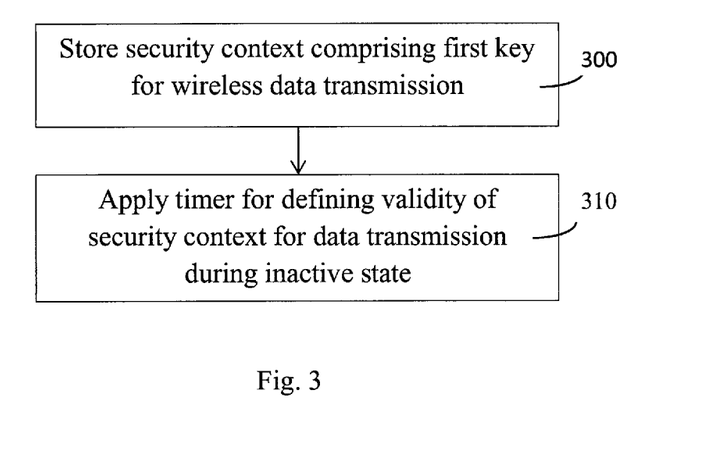
FIGS. 3, 4 and 5 illustrate methods in accordance with at least some embodiments of the present invention.

FIG. 3 illustrates a solution for managing a security context in inactive state according to some embodiments. The general method may be applied in user equipment, such as the UE 100 and an access network node 110a, 110b. A security context is established and stored 300. Depending on embodiment, this may be carried out in response to entering the active state 210 or the inactive state 200. The security context refers generally to security information applied for wireless data transmission. The security context comprises at least a first key, which may also be referred to as a security (context) or cryptographic key. According to some embodiments, the key is applied for deriving the encryption (or ciphering) key and integrity protection (or integrity) key for security protecting data and/or signalling messages transferred over the wireless interface. However, in some embodiments, the security context may directly store at least one encryption key, integrity key and/or some other cryptographic key. The derivation of the encryption and/or integrity key based on the key refers generally to generation of the encryption and/or integrity key on the basis of the key. The security context may comprise also other security parameters, depending on the embodiment. In some embodiments, the security context refers to 3GPP access stratum (AS) security context, and further to AS security context defined in 3GPP N-RAT specifications.

A timer for defining validity of the security context for the data transmission is applied 310 during an inactive state. Step 310 may be entered directly upon storing 300 (new or updated/regenerated) security context, or there may be further steps or conditions for activating the timer. The timer may also be referred to as a security context active timer. In some embodiments the timer can be understood as a time frame or a time offset between defining or activating the security context and when the validity of security context expires.

The security context active timer may be a cell or cell group specific. In response to detecting change to a new cell, the security context may be updated or re-established, already running security context active timer discarded or stopped, and the timer restarted according to newly or earlier received configuration information.

Application 310 of the timer enables to avoid recreation of the security context, i.e. the recalculation of the key for each new non-scheduled data transmission activity during the inactive state, hence enabling to reduce signalling and related processing, and thus save power. The application of the timer enables to align security context usage during the inactive state between the user equipment and the network node, for example to avoid use of different keys at the network node 110a, 110b and the UE 100.

In response to detecting that the timer has expired or is expiring, security context needs to be re-established or updated at least partly. In some embodiments, a message for this purpose, in the some embodiments for causing calculation of a second key for subsequent data transmission during the inactive state is generated and sent between the UE 100 and the access network node 110a.

Figure 4:
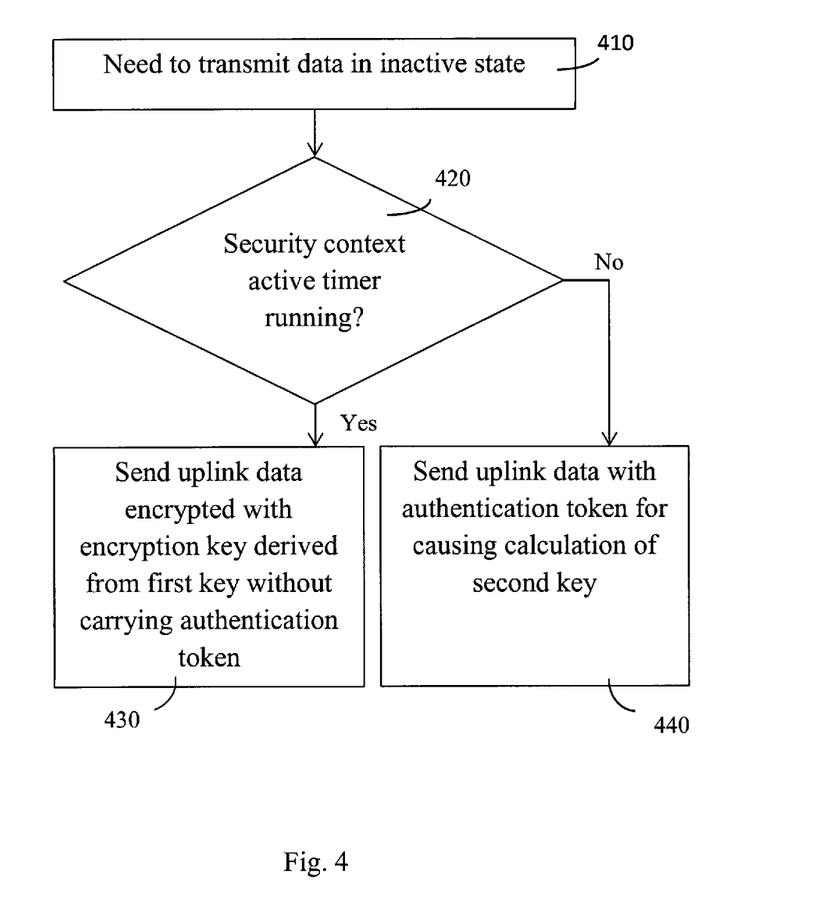

FIG. 4 illustrates application of the security context active timer according to some embodiments. The method may be applied by the UE 100, for example. In response to a need 410 to transmit data, such as non-scheduled uplink data, in the inactive state, the security context active timer is checked 420. In response to the timer running, the ciphered data may be sent 430 without state or mode change (from the inactive state) or change (or refreshment) of the security context key. Hence, the data may be encrypted with an encryption key derived from the first key of the stored security context and the encrypted data may be sent 430 without an authentication token applied in connection with the security context update/establishment.

In response to detecting that the timer has expired, the message for causing calculation of a second key for subsequent data transmission during the inactive state may be generated and sent 440. The message comprises an appropriate security token applied in connection with the security context update/establishment, in some embodiments an authentication token for integrity verification before key generation. In the example embodiment of FIG. 4, such message may be a request message for sending 440 user data during inactive state, the message comprising user data encrypted with the encryption key derived from the first key of the security context. The authentication token may be calculated by using an integrity key derived from the first key of the earlier established and stored security context.

In some embodiments, the method illustrated in connection with FIG. 3 is performed by a wireless access network node 110a, 110b for non-scheduled data transmission of user equipment during the inactive state.

Figure 5:
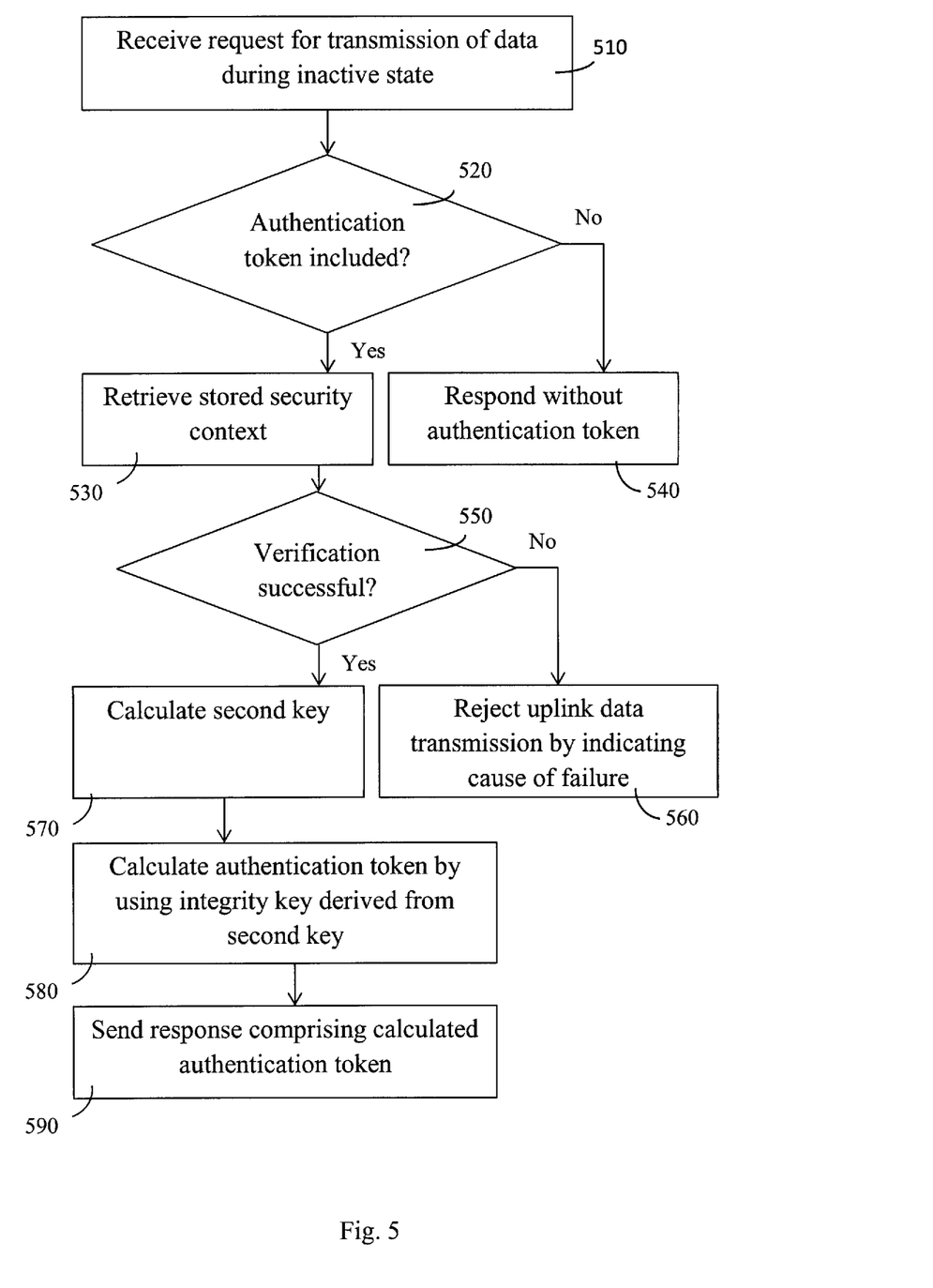

FIG. 5 illustrates some embodiments for a device receiving 510 a request message for transmission of data during an inactive state, such as the network access node 110a receiving a request from the UE 100 operating according to FIG. 4. The message is checked 510 for an authentication token from the requesting entity. If the message does not comprise an authentication token, there is no need to update the security context and the security context key. Hence, a response to the data transmission request may be generated and sent 540 without an authentication generated in response to the request.

The request received in 510 may be a message for causing update of the security context and the computation of the new second key sent in step 440. Thus, the received message comprises an authentication token, and a stored security context is retrieved 530. The security context may be retrieved from local storage or from another device, such as another network node 110b, which may be the case if the UE 100 has moved to a new cell.

In some embodiments the security context active timer is also maintained locally in the device carrying out the method of FIG. 5. Thus, the timer may also be checked after block 510. Hence, if the timer is not running and/or if the authentication token is included, the security context needs to be updated/established, and block 530 is entered. In such case, if the request did not comprise an authentication token, the UE 100 may be requested to provide the authentication token.

A verification procedure 550 is performed for the received authentication token by using the integrity key derived from the first key in the security context. In response to unsuccessful verification, change from the inactive state 200 to the active state 210 is caused 560. This may involve controlling the UE 100 to resume a radio resource connection, for example. It should be noted also in response to unsuccessful verification, change from the inactive state to the idle state maybe caused although not shown in FIG. 5.

In response to successful verification of the authentication token, the inactive state 200 may be continued but the security context is at least partly updated, by calculating 570 the new (second security context) key. An authentication token may be calculated 580 by using an integrity key derived from the newly generated second key and hence the new or updated security context.

In some embodiments, the message causing calculation of the second key is a response message to a request message from the user equipment comprising user data encrypted with the encryption key derived from the first key. The response message may comprise an authentication token for the user equipment. In the example embodiment of FIG. 5, such message comprising the authentication token calculated by the integrity key derived from the second key may be generated and sent 590.

Upon receiving such response message by a device, such as the UE 100 from the access node 100a, the second key may be calculated locally by the device. The authentication token in the received message is verified by using an integrity key derived from the newly calculated second key. In response to successful verification of the received authentication token, the inactive state 200 may be continued. Thus, the security context active timer may be activated for the newly updated or regenerated security context. Subsequent data during the inactive state may be ciphered by an encryption key derived from the newly calculated second key, by applying the functions illustrated in FIG. 4. Similarly as in steps 550 and 560, in response to unsuccessful verification of the authentication token, change to active state is initiated.

The purpose of authentication token is to verify the UE 100 or the network node 110a. As illustrated above, once the UE has passed the security check, it is not necessary to send the authentication token in every subsequent UL data transmission during the inactive state according to some embodiments, which enables to reduce signaling over the air interface and related processing. With the application of the security context timer, device operation may be aligned and the UE 100 knows when the authentication token is required and when not.

In some embodiments, the authentication token is a message authentication code for integrity (MAC-I). The authentication token and the security for the inactive state 200 may be calculated 440, 580 as they are calculated for the active state 210. In an example embodiment, when applied in 3GPP N-RAT, a short MAC-I as or similar to applied in connection with RRC connection signalling may be calculated 440, 580 by the 3GPP UE and the gNB. The MAC-I may be calculated over a PDU header and a data part of the packet data convergence protocol (PDCP) Data PDU before ciphering. Another example option is to calculate the MAC-I over UE variable VarShortResumeMAC-Input according to the parameter defined for the E-UTRA RRC resume procedure, where the BEARER ID, COUNT and DIRECTION may be set to binary ones. Further information on such current UE variable is available at 3GPP specification 36.331, page 732 of version 13.3.0. However, it is to be understood that some other UE variable than the VarShortResumeMAC-Input and another RRC procedure could be used, depending on how the security contexts and state transition is designed for the 3GPP NR.

The (first/second) key may be calculated 570 on the basis of cell specific information, such as a (target) cell identifier, a channel number, and/or downlink frequency. For example, the target cell's physical cell identity (PCI) and its downlink E-UTRA Absolute Radio Frequency Channel Number (EARFCN-DL) may be applied. The key generation may be similar to the LTE's horizontal or vertical key generation. In an embodiment, the key is calculated by the 3GPP UE and the gNB as or similar to the 3GPP $K_{eNB}$. gNB or node specific parameters may also be used instead of cell specific parameters. In an embodiment, the existing or the first key is used as input for calculating the second key. However, it will be appreciated that other parameters may additionally and/or instead be applied, e.g. for 3GPP 5G NR depending on the final security design for the N-RAT.

Figure 6:
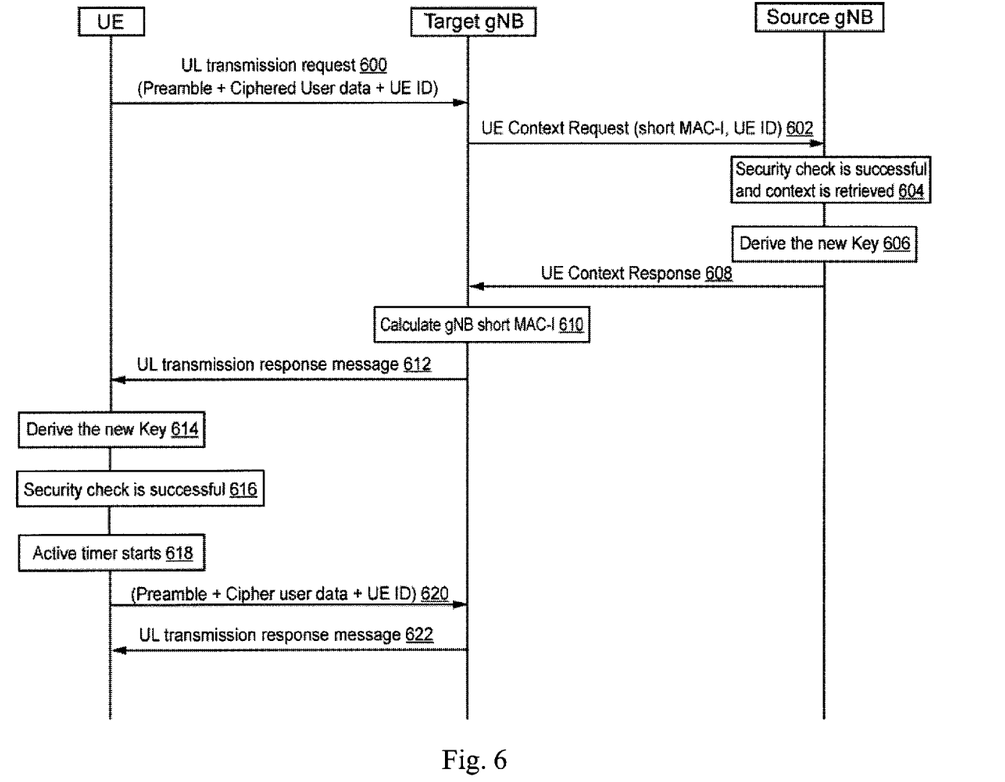
FIGS. 6 to 8 illustrate signalling in accordance with at least some embodiments of the present invention.

In an embodiment, the UE 100 has moved to a new cell or other coverage area of another (target) network node 110b, and a previous (source) network node 110a performs authentication token verification 550 in response to a request of the new target network node 110b. According to some embodiments, in such case the security context and the security context key needs to be updated, but the UE may send pending uplink data using the previous encryption key while indicating the need for renewing the security context/key. Such example embodiment is illustrated in FIG. 6 in the context of 3GPP N-RAT elements.

The UE in the inactive state may operate as illustrated above in connection with FIG. 4. Instead of in addition to block 420, there may be also a check for change of cell, and block 440 may be entered in response to change of cell (and/or the non-running of the timer). In the present example the security context active timer is not running upon need to transmit non-scheduled uplink (UL) data, and the UE sends a UL transmission request 600 comprising an MAC-I and user data ciphered by the encryption key derived from the (first) key of the current security context. The message may comprise a preamble, a UE identifier and possible other information as specified for 3GPP N-RAT.

Upon receiving the request 600, a target gNB requests the UE context from a source gNB by a UE Context Request or other message over the interface between gNBs 602 comprising the UE ID and the received MAC-I. The source gNB retrieves the UE context and verifies 604 the UE by the MAC-I. If the UE context verification is successful, the source gNB derives 606 the new (second) key. The source gNB then responds 608 to the target gNB with the UE context comprising the updated AS security context, the new key being a part of the AS security context.

The target gNB then calculates 610 an MAC-I based on the received AS security context and sends a DL response message 612 which comprises the gNB calculated MAC-I, the feedback for the requested UL data transmission, including the UE ID or the preamble, and the temporary C-RNTI, which is used by the UE for subsequent data transmission or reception. Security context active timer configuration may also be included.

Upon receiving the response 612, the UE calculates 614 the new (second) key according to respective 3GPP key requirements. Then the received MAC-I is verified by using the integrity key derived from the new key. If the UE verifies the received short MAC-I successfully 616, it starts 618 the security context active timer. UL data may then be transmitted 620 in the inactive state during the running of the timer without carrying the short MAC-I. gNB thus does not include the MAC-I in the transmission response message 622.

In response to a failure or rejection of transmitting the data during the inactive state, a change to an active state may be caused. The network access node 110a may detect this failure or rejection and cause change to the active state. This may comprise sending a message indicating the failure or rejection of data transmission during the inactive state to the UE 100. In response to receiving such message, the UE initiates mode change from inactive to active state. This may involve resume of RRC connection, or other RRC procedure comprising also security context renewal or update with calculation of new encryption key. After the change to the active state has been carried out, retransmission of the user data may be carried out.

Figure 7:
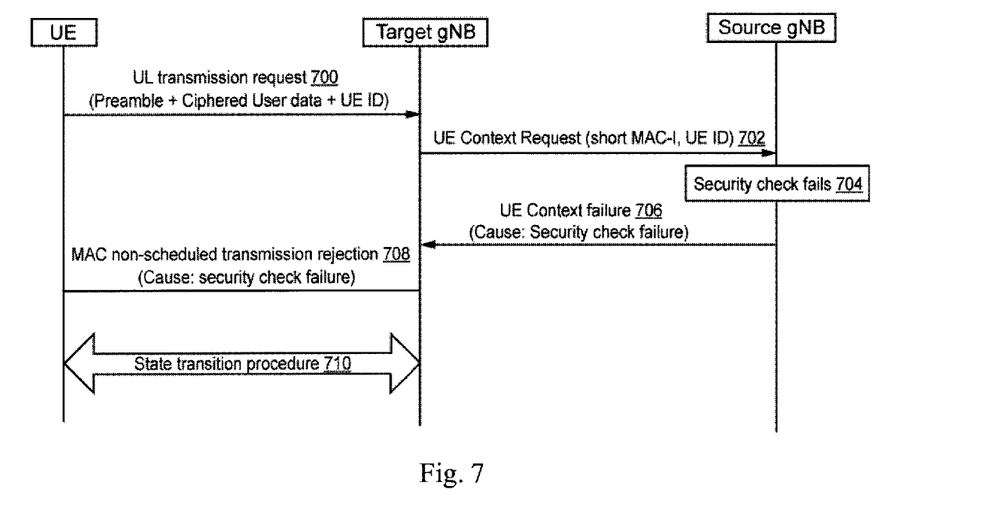
Figure 8:
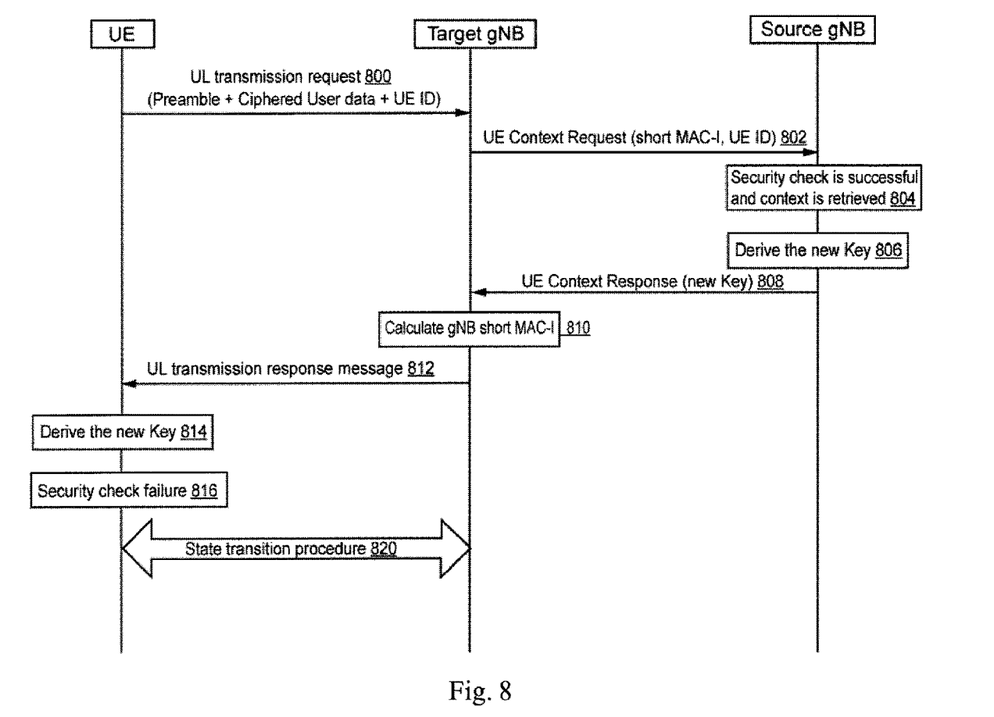

FIGS. 7 and 8 illustrate some example embodiments of managing error situations in the context of 3GPP N-RAT elements. After messages 700 and 702, similar to messages 600 and 602 of FIG. 6, if the verification of the UE and the authentication token in the gNB fails 704, the source gNB indicates this to the target gNB by a UE Context failure message or other corresponding message over interface between gNBs 706. The target gNB may then send a MAC non-scheduled UL transmission rejection message 708, comprising the indication of the security check failure. The UE then falls back to state transition procedure 710. Thus, the UE may request state transition from RRC_INACTIVE to RRC_CONNECTED.

There may be also other reasons for rejecting the requested data transmission, such as a lack of valid user equipment context or an overload of non-scheduled transmission resource. Such cause may also be indicated in the rejection message 708. It is also to be noted that in some error situations, the UE may be caused to change 710 from inactive to idle state, depending on how the network configures the UE to handle the error case.

FIG. 8 illustrates an example of erroneous security check for security context update at UE during inactive mode after UL data transfer. After 800 to 814, similar to 600 to 614 of FIG. 6, if the UE fails 816 to verify the MAC-I carried in the response message 808 by the newly calculated 814 key, it will also fallback to initiate the state transition procedure 820.

It is to be noted that in case the UE has not moved under a new target gNB, a single serving gNB may be arranged to carry out the source and target gNB actions illustrated above in FIGS. 6 to 8 without inter-gNB signalling.

Figure 9A:
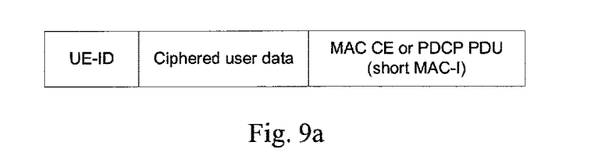
FIGS. 9a, 9b, 10a and 10b illustrate messages in accordance with at least some embodiments of the present invention.
Figure 9B:
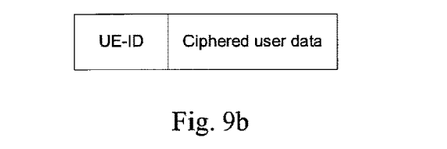

FIGS. 9a and 9b illustrate examples of new message structures which may be applied for uplink non-scheduled data transmission during the inactive state. Such new messages or message elements may be applied between 3GPP NG UE and gNB as part of signaling during the inactive state 200. If the timer is not running, the message structure of FIG. 9a comprising the authentication token or the MAC-I may be used. This message could be a MAC control element (CE) or a PDCP Control PDU. FIG. 9b illustrates message structure which may be used when the timer is running.

In the uplink, the uplink data may comprise a preamble, a UE ID, and ciphered user data which may be multiplexed with the new authentication token message element (the MAC-I) optionally depending on whether the security active timer is running.

Figure 10A:
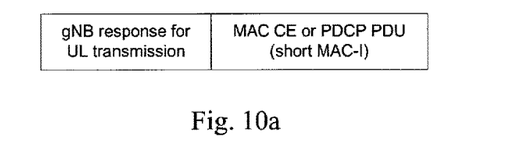
Figure 10B:
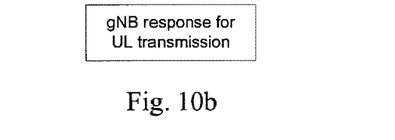

In downlink, illustrated in FIGS. 10a and 10b, the downlink data could be a gNB response for non-scheduled transmission multiplexed with the new authentication token message element, in the present example the MAC-I. This element may be included optionally depending on whether the MAC-I is received in the UL data. FIG. 10a illustrates a message with an element for the MAC-I and 10b without the authentication token.

In order to reduce the delay to recover from the abnormal cases caused by detection of a security failure, non-presence of valid UE context, or congestion in the non-scheduled resource, the new downlink message of FIGS. 10a and 10b may be applied. Hence, the UE may be informed about the failure cause and may proceed with a proper procedure accordingly. This enables to avoid or reduce unnecessary retransmissions to reduce the signaling overhead, UE power consumption and the data transmission latency. In addition the interference to the data transmission from other UEs from the same non-scheduled resource may also be decreased to reduce the collision probability and improve the success of the non-scheduled UL transmission.

Timer configuration information may be transmitted to and received by the UE 100 in at least one of: system information broadcast, radio resource control signalling causing the user equipment to inactive state, and a response to the data transmission request during the inactive state. The gNB response message 590, 612, FIG. 10a, and FIG. 10B may also include UE specific security active timer configuration. The UE applies this timer configuration information when it starts 310, 618 the security active timer.

The network access node 110a, 100b, such as the gNB, may use the security context active timer when determining if the UE 100 has subsequent packets or not. For example, if the gNB receives a given number of packets while the UE is in the inactive state and the security context active timer is running, it may decide to initiate state transition to the active state.

It is to be appreciated that various embodiments illustrated in the above FIGS. 4 to 8 may be applied in various combinations with other embodiments and in isolation from the other features in the same Figure and related description. For example, above-illustrated security context and security context active timer related features may be applied also outside the UL data transfer. Such embodiment may be applied if there becomes a need for the network to command security context update, or if the security context is updated after change of cell regardless of if there is UL to be transmitted, for example. In some other examples, at least some of the above-illustrated new message and functions on sending and receiving a message comprising the authentication token during inactive mode may be applied in isolation of the above disclosed application of the security context active timer features. Furthermore, at least some of the above-illustrated new message and functions on sending and receiving a message indicating an error cause value for failed data transmission during inactive mode may be applied in isolation of the above disclosed other features, such as the security context active timer features.

Figure 11:
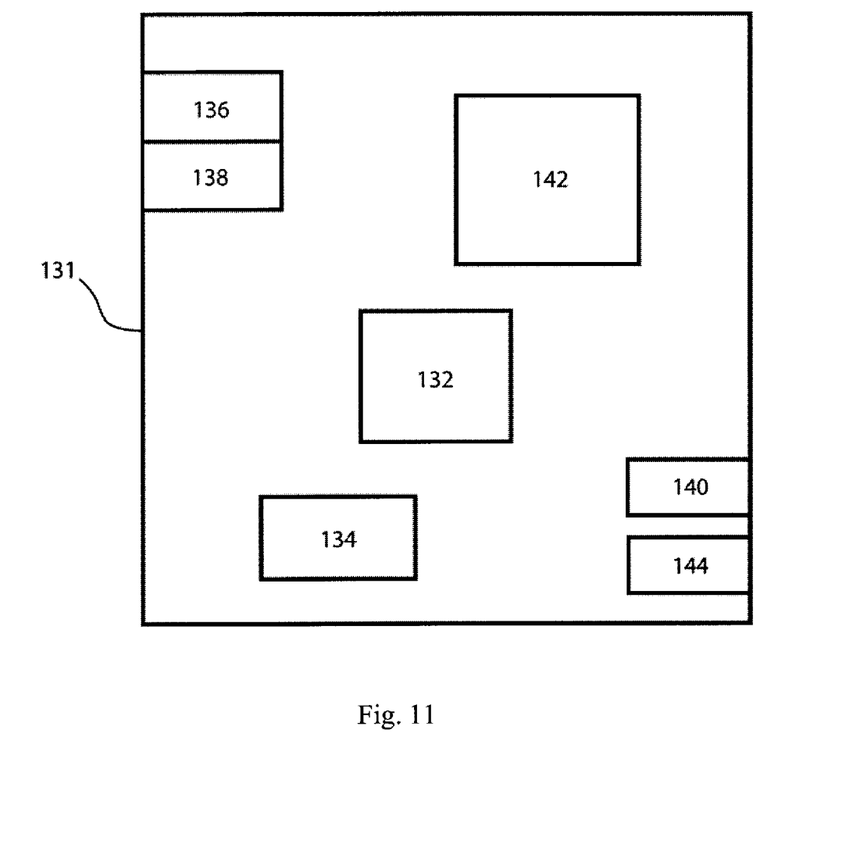
FIG. 11 illustrates an example apparatus capable of supporting at least some embodiments of the present invention.

At least some of the embodiments illustrated above may be carried out by an electronic apparatus or device comprising a wireless communications unit configured for inactive state communications or a controller for controlling inactive state wireless communications. FIG. 11 illustrates an example apparatus capable of supporting at least some embodiments of the present invention. Illustrated is a device 130, which may comprise an electronic communication device, such as a 3GPP N-RAT compliant UE or gNB communication device.

Comprised in the device 130 is a processor 132, which may comprise, for example, a single- or multi-core processor wherein a single-core processor comprises one processing core and a multi-core processor comprises more than one processing core. The processor 132 may comprise more than one processor. The processor may comprise at least one application-specific integrated circuit, ASIC. The processor may comprise at least one field-programmable gate array, FPGA. The processor may be means for performing method steps in the device. The processor may be configured, at least in part by computer instructions, to perform actions.

The device 130 may comprise memory 134. The memory may comprise random-access memory and/or permanent memory. The memory may comprise at least one RAM chip. The memory may comprise solid-state, magnetic, optical and/or holographic memory, for example. The memory may be at least in part accessible to the processor 132. The memory may be at least in part comprised in the processor 132. The memory 134 may be means for storing information. The memory may comprise computer instructions that the processor is configured to execute. When computer instructions configured to cause the processor to perform certain actions are stored in the memory, and the device in overall is configured to run under the direction of the processor using computer instructions from the memory, the processor and/or its at least one processing core may be considered to be configured to perform said certain actions. The memory may be at least in part comprised in the processor. The memory may be at least in part external to the device 130 but accessible to the device.

The device 130 may comprise a transmitter 136. The device may comprise a receiver 138. The transmitter and the receiver may be configured to transmit and receive, respectively, information in accordance with at least one cellular or non-cellular standard. The transmitter may comprise more than one transmitter. The receiver may comprise more than one receiver. The transmitter and/or receiver may be configured to operate in accordance with global system for mobile communication, GSM, wideband code division multiple access, WCDMA, long term evolution, LTE, 3GPP new radio access technology (N-RAT), IS-95, wireless local area network, WLAN, Ethernet and/or worldwide interoperability for microwave access, WiMAX, standards, for example. The device 130 may comprise a near-field communication, NFC, transceiver 140. The NFC transceiver may support at least one NFC technology, such as NFC, Bluetooth, Wibree or similar technologies.

The device 130 may comprise user interface, UI, 142. The UI may comprise at least one of a display, a keyboard, a touchscreen, a vibrator arranged to signal to a user by causing the device to vibrate, a speaker and a microphone. A user may be able to operate the device via the UI, for example to accept incoming telephone calls, to originate telephone calls or video calls, to browse the Internet, to manage digital files stored in the memory 134 or on a cloud accessible via the transmitter 136 and the receiver 138, or via the NFC transceiver 140, and/or to play games.

The device 130 may comprise or be arranged to accept a user identity module 144. The user identity module may comprise, for example, a subscriber identity module, SIM, card installable in the device 130. The user identity module 144 may comprise information identifying a subscription of a user of device 130. The user identity module 144 may comprise cryptographic information usable to verify the identity of a user of device 130 and/or to facilitate encryption of communicated information and billing of the user of the device 130 for communication effected via the device 130.

The processor 132 may be furnished with a transmitter arranged to output information from the processor, via electrical leads internal to the device 130, to other devices comprised in the device. Such a transmitter may comprise a serial bus transmitter arranged to, for example, output information via at least one electrical lead to memory 134 for storage therein. Alternatively to a serial bus, the transmitter may comprise a parallel bus transmitter. Likewise the processor may comprise a receiver arranged to receive information in the processor, via electrical leads internal to the device 130, from other devices comprised in the device 130. Such a receiver may comprise a serial bus receiver arranged to, for example, receive information via at least one electrical lead from the receiver 138 for processing in the processor. Alternatively to a serial bus, the receiver may comprise a parallel bus receiver.

The device 130 may comprise further devices not illustrated in FIG. 11. For example, the device may comprise at least one digital camera. Some devices 130 may comprise a back-facing camera and a front-facing camera. The device may comprise a fingerprint sensor arranged to authenticate, at least in part, a user of the device. In some embodiments, the device lacks at least one device described above. For example, some devices may lack the NFC transceiver 140, the fingerprint sensor and/or the user identity module 144.

The processor 132, the memory 134, the transmitter 136, the receiver 138, the NFC transceiver 140, the UI 142 and/or the user identity module 144 may be interconnected by electrical leads internal to the device 130 in a multitude of different ways. For example, each of the aforementioned devices may be separately connected to a master bus internal to the device, to allow for the devices to exchange information. However, as the skilled person will appreciate, this is only one example and depending on the embodiment various ways of interconnecting at least two of the aforementioned devices may be selected without departing from the scope of the present invention.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to one embodiment or an embodiment means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment. Where reference is made to a numerical value using a term such as, for example, about or substantially, the exact numerical value is also disclosed.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the preceding description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", that is, a singular form, throughout this document does not exclude a plurality.

INDUSTRIAL APPLICABILITY

At least some embodiments of the present invention find industrial application in wireless communications.

ACRONYMS LIST

3GPP Third generation partnership project
AS Access stratum
ASIC Application-specific integrated circuit
CE Control element
EARFCN E-UTRA absolute radio frequency channel number
FPGA Field-programmable gate array
GSM Global system for mobile communication
IoT Internet of things
LTE Long term evolution
N-RAT New radio access technology
NFC Near-field communication
PDCCH Physical downlink control channel
PDCP Packet data convergence protocol
UI User interface
WCDMA Wideband code division multiple access
WiMAX Worldwide interoperability for microwave access
WLAN Wireless local area network

What is claimed is:

1. A method, comprising:
   storing, by a user equipment of a communication network, a security context comprising a first key for wireless data transmission, and applying a timer during an inactive state between the user equipment and a network node of the communication network for defining validity of the security context for the data transmission during the inactive states;
   in response to detecting that the timer has expired or is expiring, causing transmission of a message for causing calculation of a second key for subsequent data transmission during the inactive state, wherein the message comprises an authentication token comprising a message authentication code for integrity,
   wherein during the inactive state there is radio access and network connection information maintained by the user equipment for performing data transmission by the user equipment of the communication network during the inactive state.

2. The method of claim 1, farther comprising:
   causing ciphering of user data by an encryption key derived from the first key, and
   in response to the timer running, causing transmission of the ciphered user data in the inactive state without state change or change of key.

3. The method of claim 2, wherein the ciphered data is caused to be transmitted without an authentication token in response to the timer running.

4. The method of claim 1, wherein the timer is a cell-specific security active timer, and in response to detecting change to a new cell, causing update or re-establishment of the security context.

5. The method of claim 1, wherein the first key and the second key are based on cell specific information comprising a target cell identifier, and at least one of a channel number or downlink frequency for the transmission.

6. The method of claim 1, wherein based on a presence of the authentication token in the message, the second key causes one of updating or re-establishing the security context.

7. An apparatus comprising at least one processing core, at least one memory including computer program code, the at least one memory and the computer program code being configured to, with the at least one processing core, cause the apparatus at least to:

store by the apparatus in a communication network a security context comprising a first key for wireless data transmission;

apply a timer during an inactive state between the apparatus and a network node of the communication network for defining validity of the security context for the data transmission during an inactive state; and in response to detecting that the timer has expired or is expiring, causing transmission of a message for causing calculation of a second key for subsequent data transmission during the inactive state, wherein the message comprises an authentication token comprising a message authentication code for integrity, wherein during the inactive state there is radio access and network connection information maintained by the apparatus for performing data transmission by the user equipment of the communication network during the inactive state.

8. The apparatus of claim 7, wherein the apparatus is further configured to cause ciphering of user data by an encryption key derived from the first key, and cause transmission of the ciphered user data in the inactive state without state change or change of key in response to the timer running.

9. The apparatus of claim 8, wherein the at least one memory including computer program code is configured with the at least one processing core to cause the apparatus to perform transmission of the ciphered data without an authentication token in response to the timer running.

10. The apparatus of claim 7, wherein the timer is a cell-specific security active timer, and the at least one memory including computer program code is configured with the at least one processing core to cause the apparatus to perform an update or re-establishment of the security context in response to detecting change to a new cell.

11. The apparatus of claim 7, wherein the the first key and the second key are based on cell specific information comprising a target cell identifier, and at least one of a channel number or downlink frequency for the transmission.

12. The apparatus of claim 7, wherein based on a presence of the authentication token in the message, the second key causes one of updating or re-establishing the security context.

13. The apparatus of claim 7, wherein the apparatus comprises or is configured to control user equipment for non-scheduled data transmission during the inactive state.

14. The apparatus of claim 13, wherein the message for causing calculation of the second key is a request message comprising user data encrypted with the first key of the security context.

15. The apparatus of claim 14, wherein the at least one memory including computer program code is configured with the at least one processing core to cause the apparatus to perform:

calculation of the authentication token by using the first key.

16. The apparatus of claim 14, wherein the apparatus is further configured to cause: reception of a response comprising an authentication token from an access network node, calculation of the second key, in response to successful verification of the authentication token from the access network node, activation of the timer and causing ciphering of subsequent data by an encryption key derived from the second ciphering key.

17. The apparatus of claim 16, wherein the apparatus is further configured to cause change to an active state or an idle state in response to receiving a response message rejecting the data transmission during the inactive state.

18. The apparatus of claim 17, wherein the rejection message indicates a failure in checking the authentication token, lack of valid user equipment context, or an overload of non-scheduled transmission resource.

19. The apparatus of claim 18, wherein the at least one memory including computer program code is configured with the at least one processing core to cause the apparatus to perform:

reception of timer configuration information by user equipment in at least one of: system information broadcast, radio resource control signalling causing the user equipment to inactive state, and a response to the data transmission request during the inactive state.

20. A non-transitory computer readable medium having stored thereon a set of computer readable instructions that, when executed by at least one processor, cause an apparatus to at least:

store by a user equipment of a communication network a security context comprising a first key for wireless data transmission, and apply a timer during an inactive state between the user equipment and a network node of the communication network for defining validity of the security context for the data transmission during an inactive state, wherein during the inactive state there is radio access and network connection information maintained by the user equipment for performing data transmission by the user equipment of the communication network during the inactive state.

* * * * *